(12) United States Patent
Gospel et al.

(10) Patent No.: US 6,753,928 B1
(45) Date of Patent: Jun. 22, 2004

(54) METHOD AND APPARATUS FOR PROVIDING FEEDBACK DURING PROGRAMMING OF A TELEVISION APPARATUS

(75) Inventors: Thomas Edward Gospel, Carmel, IN (US); Robert Skipworth Comer, Carmel, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 316 days.

(21) Appl. No.: 09/603,230

(22) Filed: Jun. 26, 2000

Related U.S. Application Data

(60) Provisional application No. 60/166,012, filed on Nov. 17, 1999.

(51) Int. Cl.[7] .................................................. H04N 5/50
(52) U.S. Cl. ........................ 348/569; 348/554; 348/565
(58) Field of Search ................................ 348/569, 564, 348/563, 565, 554, 705, 706, 734, 570, 553, 731, 732; H04N 5/50

(56) References Cited

U.S. PATENT DOCUMENTS

| | | | | |
|---|---|---|---|---|
| 5,438,375 A | * | 8/1995 | Sasabe et al. ................ | 348/706 |
| 5,528,304 A | * | 6/1996 | Cherrick et al. .............. | 725/41 |
| 5,621,456 A | | 4/1997 | Florin et al. .................. | 348/7 |
| 5,650,827 A | | 7/1997 | Tsumori et al. ............. | 348/565 |
| 6,211,921 B1 | * | 4/2001 | Cherian et al. ............. | 348/565 |
| 6,219,042 B1 | * | 4/2001 | Anderson et al. ........... | 345/716 |

FOREIGN PATENT DOCUMENTS

| | | | |
|---|---|---|---|
| EP | 0377334 B2 | 7/1990 | ............ H04N/5/45 |
| EP | 0536901 B1 | 4/1993 | .......... H04N/5/445 |
| WO | WO97/34414 | 9/1997 | .......... H04N/5/455 |

OTHER PUBLICATIONS

Yasushi Kurokawa and Koichi Sunada: "Multifuncional TV receiver," Ch.6, vol. 41, No. 12 pp. 1147–1152 (translation enclosed).
Digital Technology in the Digivision 3896 Multicontrol: picture within a picture—INS 87–01 2858796 B87028765 (EEA NDN–161–0285–8796–0. (translation enclosed).

* cited by examiner

*Primary Examiner*—Michael H. Lee
(74) *Attorney, Agent, or Firm*—Joseph S. Tripoli; Robert D. Shedd

(57) ABSTRACT

A television apparatus and method provides visual/audio feedback to a user via the auxiliary image (i.e., PIP window) simultaneously during the menu selection process for configuring the television system. The apparatus enables a user to verify the connection between an auxiliary video/audio source device (e.g., DVD player, satellite receiver, VCR etc.) and a desired input source of the television receiver during the configuration process of the television system. The television apparatus includes a television receiver suitable for generating video output signals for displaying a multi-image on a display device. The multi-image displays comprise a main image corresponding to the currently tuned/selected input signal and an on-screen display ("OSD") of a configuration menu. The multi-images comprise the main image, the configuration menu and an auxiliary image, such as picture-in-picture (PIP) and picture-outside-picture (POP) displays.

8 Claims, 8 Drawing Sheets

METHOD AND APPARATUS FOR PROVIDING FEEDBACK DURING PROGRAMMING OF A TELEVISION APPARATUS

CROSS-REFERENCE TO RELATED PATENT APPLICATIONS

This is a non-provisional patent application based on co-pending provisional patent application serial number 60/166,012 filed Nov. 17, 1999, entitled METHOD AND APPARATUS FOR PROVIDING CONNECTIVITY FEEDBACK OF AN AUXILIARY DEVICE TO A TELEVISION APPARATUS.

FIELD OF THE INVENTION

The invention relates to systems for generating signals suitable for producing a multi-image display having a main image and an auxiliary image such as picture-in-picture (PIP) and picture-outside-picture (POP) displays. More particularly, the invention relates to a method and apparatus for providing video/audio feedback to a user through the auxiliary image to confirm the connection between an auxiliary source device (e.g., DVD player, VCR, satellite receiver, etc.) and a television apparatus during programming of the television apparatus.

BACKGROUND OF THE INVENTION

Many consumer electronics include on-screen displays (OSDs) to provide a user-interface to enable a user to conveniently program and/or configure the components of the systems. Typically, the OSDs comprise a plurality of menus that include instructions and options for configuring the parameters of the video display and audio components of the system. The problem with configuring the systems using OSDs is that no feedback is provided of the actual video or audio signal being configured or altered.

The process of "autotuning" a television system is illustrative of this problem. Autotuning is the process of mapping a channel or desired input source to a key of a remote control unit, which enables a user to tune or select a particular channel or input source by actuating the corresponding mapped key. For example, when connecting a new video/audio source (i.e. VCR, DVD, satellite receiver, etc.) to a television receiver, the consumer may have various options, either connecting the devices together via RF input, or a video input (i.e. Video 1, S-Video 1). Consumer's can then utilize the "AUTOTUNE" on-screen display ("OSD") menu option to map a video/audio input source to a given television receiver input.

While current television receivers enable a user, using an OSD, to map input sources to the television receiver's inputs; these systems do not provide simultaneously feedback to the user during the programming/mapping process. To verify whether the desired input source is properly mapped to the television receiver, the user must either exit the mapping process or close the OSD menu. For instance, one method for verifying proper mapping includes clearing the active OSD menu from the display screen and selects the desired channel or input source using the mapped key. If the correct input video signal is displayed, the key is properly mapped. If not, the user must then reactivate the entire menu and return to the original setting selection to confirm the proper programming the television receiver. If the input source is properly mapped to the desired input of the receiver, then the user must verify the video/audio source is properly connected to the desired input of the receiver.

Another method of verifying proper mapping includes the user actuating the "INPUT" key to select the desired channel, resulting in the active menu being overlaid on the video of the selected channel. This overlaying of the active menu on the video image prevents confirmation of channel. Similarly, the user may select a channel using the CH+/CH- keys on the remote control. This presents an additional problem if the input channel is not present in the scan list, and thus, preventing tuning and confirmation.

Furthermore, the channel selection may not be directly accessible using the digit keys on the remote control unit without changing the menu. This is particularly true when the menu option of the OSD menu is selectable using the digits of the remote control unit.

None of these prior art television receivers, however, utilizes an auxiliary image feature to provide connection video/audio feedback simultaneously to the consumer when the OSD menu is displayed.

SUMMARY OF THE INVENTION

In accordance with an aspect of the present invention, a television apparatus comprises means for generating a menu signal 52 suitable for displaying a menu in a first region of a display. The menu includes a plurality of options, wherein each menu option is associated with a respective one of a plurality of source signals. The television apparatus further includes means for selecting one of the menu options of the system menu in response to a selection signal provided by a user; and means for generating a feedback signal suitable for communicating to the user while the menu is displayed. The feedback signal is associated with the highlighted menu option.

In accordance with another aspect of the present invention, a method for programming a television apparatus includes generating a menu signal suitable for displaying a menu in a first region of a display. The menu includes a plurality of options, each menu option being associated with a respective one of a plurality of source signals. The method also includes selecting one of the menu options of the menu in response to a selection signal provided by a user; and generating a feedback signal suitable for communicating to the user while the menu is displayed. The feedback signal is associated with the highlighted menu option.

Accordingly, the present invention allows an auxiliary image included in a television display to display simultaneously the video/audio signal of the input source or channel being mapped and the OSD menu during the mapping process, and thereby, providing feedback to the consumer that the source is correctly connected to the television.

BRIEF DESCRIPTION OF THE DRAWINGS

The teachings of the present invention can be readily understood by considering the following detailed description in conjunction with the accompanying drawings, in which.

DETAILED DESCRIPTION OF THE INVENTION

Figure 1:
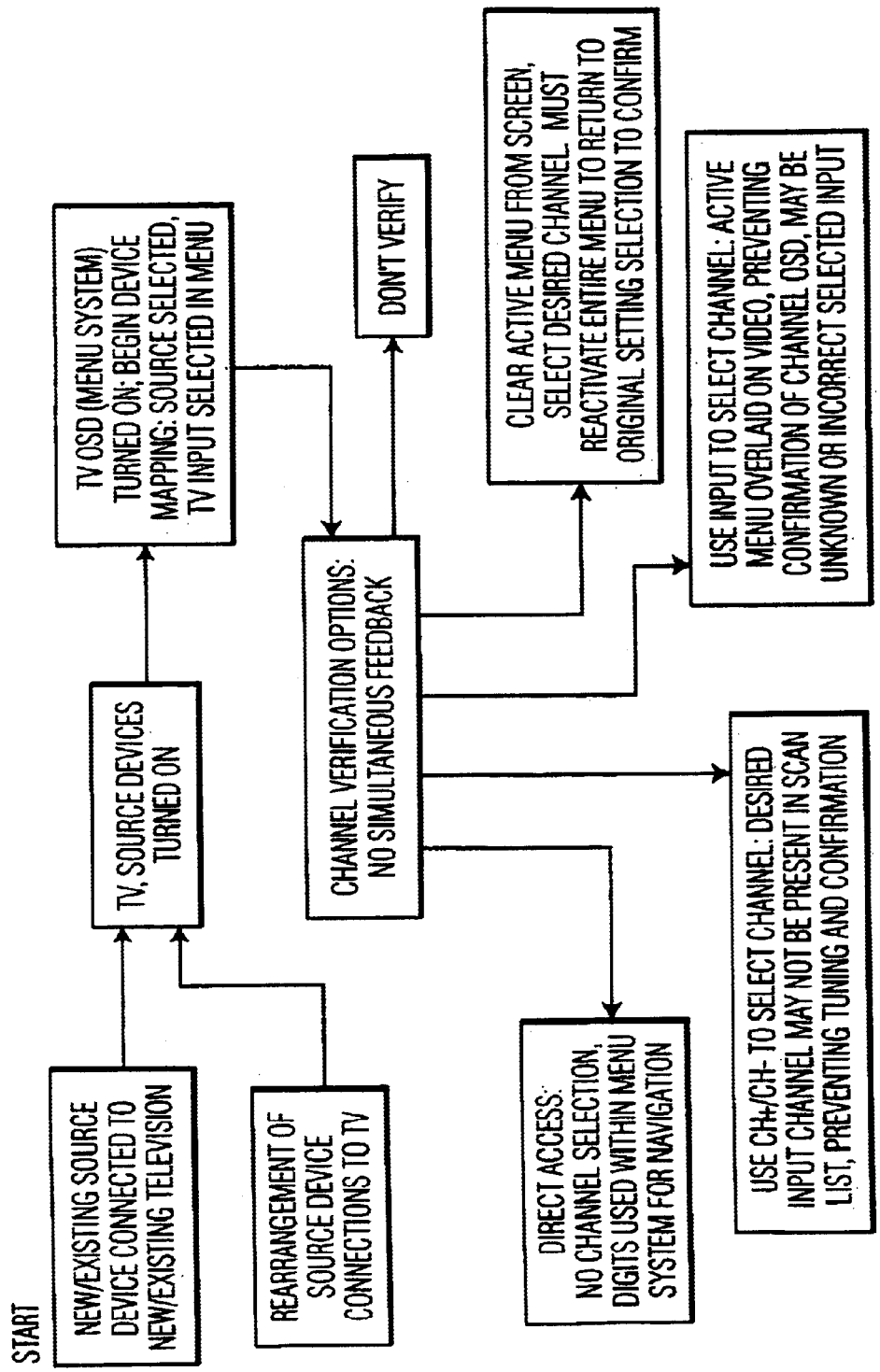
FIG. 1 depicts a block diagram of a television receiver and display embodying aspects of the present invention.
Figure 3:
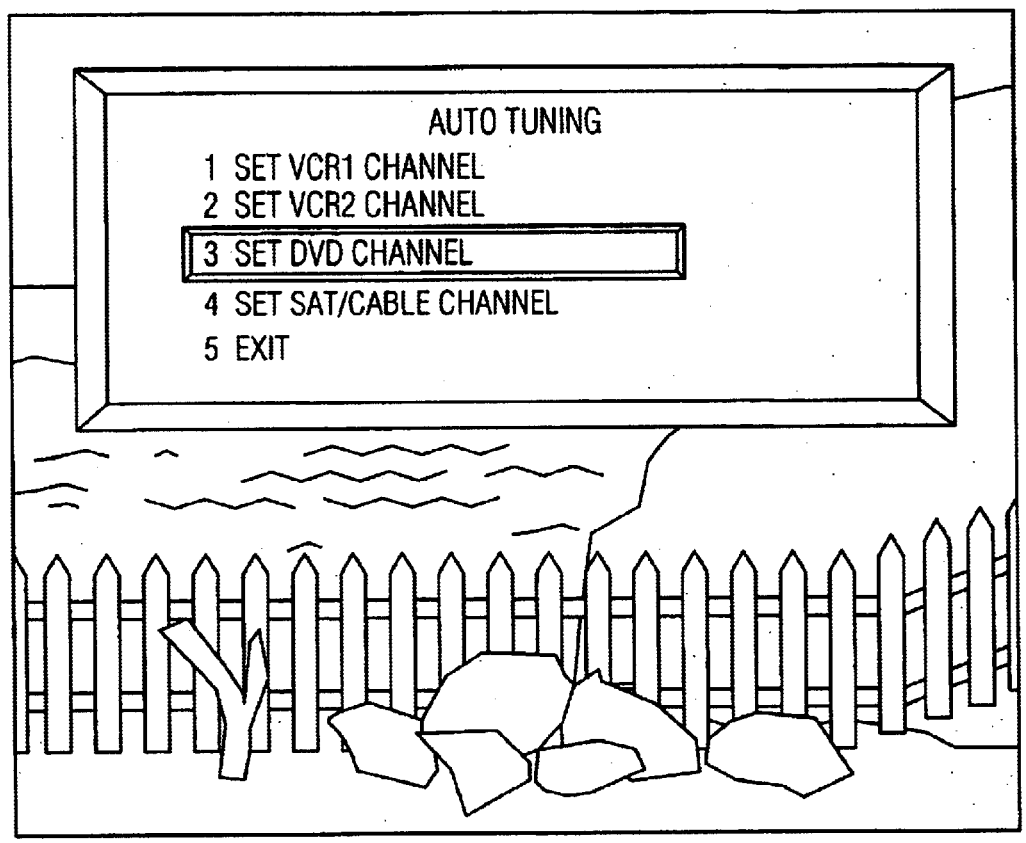
FIG. 3 depicts a screen display of the present invention showing an "AUTOTUNING" menu displayed within a main picture.
Figure 4:
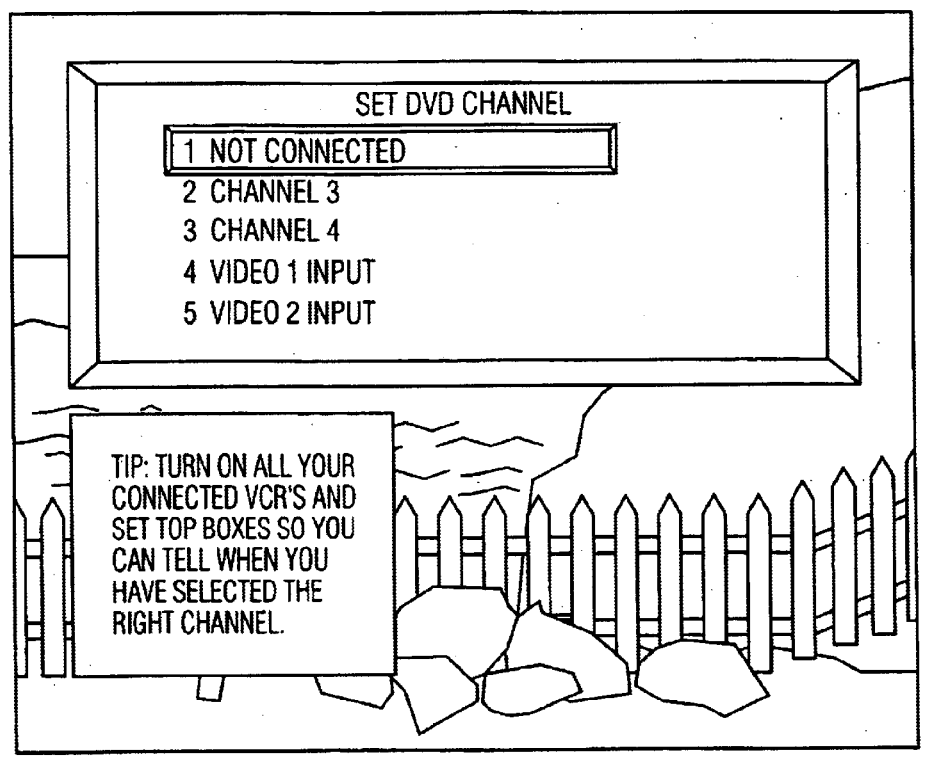
FIG. 4 depicts a screen display of the present invention showing a "SET DVD CHANNEL" menu displayed within a main picture.

FIG. 1 shows a television system 10 including a television receiver 12 suitable for generating video output signals for displaying a multi-image 14 on a display device 16, as shown in FIGS. 3–8. As shown in FIGS. 3 and 4, the multi-image displays 14 comprise a main image 18 corresponding to the currently tuned/selected input signal and an on-screen display ("OSD") of a configuration menu 19. As shown in FIGS. 5–8, the multi-images 14 comprise the main image 18, the configuration menu 19 and an auxiliary image 20, such as picture-in-picture (PIP) and picture-outside-picture (POP) displays.

The present invention provides visual/audio feedback to a user via the auxiliary image 20 (i.e., PIP window) simultaneously during the menu selection process for configuring the television system. This feature enables a user to verify the connection between an auxiliary video/audio source device (e.g., DVD player, satellite receiver, VCR etc.) and a desired input source 22, 24, 26 of the television receiver 12 during the configuration process of the television system.

For example, during the channel mapping process (i.e., "Autotuning" process), the television receiver generates signals suitable for displaying, simultaneously on the display, the configuration menu and the video signal provided at the input source highlighted in the configuration menu via the PIP window 20. During the "Autotuning" process, as shown in FIGS. 3–8, the user activates a menu system that displays a corresponding menu 19 for configuring the television receiver by associating a desired input source to a key on a remote control 28. Typically, the menus are overlaid on the live video of the currently tuned/selected input signal. The present invention provides means and a method for the user to simultaneously display a configuration menu 19, and a video signal via the PIP window 20 received from the input source (22, 24, 26) of the television receiver 12 associated with an option highlighted in a displayed configuration menu 19, which will be described in greater detail hereinafter.

The television receiver 12 shown in FIG. 1 has a first input 22 for receiving television signal RF-IN at RF frequencies; and second and third inputs 24, 26 for receiving baseband television signals VIDEO 1 IN and VIDEO 2 IN, respectively. Signal RF-IN may be supplied from a source such as an antenna, cable system or video cassette recorder (VCR), while signals VIDEO 1 IN and VIDEO 2 IN may be supplied, for example, by a DVD player (DVD), a satellite receiver or video cassette recorder (VCR). Tuners 32, 33 and IF processors 34, 35 operate in a conventional manner for tuning and demodulating a particular television signal that is included in signal RF-IN. IF processors 34, 35 produce baseband video signals VIDEO A and VIDEO B, respectively, representing the video program portion of the tuned television signal. IF processors 34, 35 also produce a baseband audio signal that are coupled to an audio processing section (not shown in FIG. 1) for further audio processing. Although FIG. 1 shows dual tuners 32, 33 and IF processors 34, 35, the television receiver 12 could include a single tuner and IF processor similar to units 32 and 34. While RF_IN is provided to both tuners 32, 33, one skilled in the art will appreciate that a second RF_IN signal source may be provided to the second tuner 33.

The television receiver 12 shown in FIG. 1 also includes a main microprocessor (uP) 36 for controlling components of the television receiver such as tuners 32, 33, picture-in-picture processing unit 38 and video signal processor 40. As used herein, the term "microprocessor" represents various devices including, but not limited to, microprocessors, microcomputers, microcontrollers and controllers. Microprocessor (uP) 36 controls the system by sending and receiving both commands and data via serial data bus I2C_BUS that utilizes the well-known I$^2$C serial data bus protocol. More specifically, central processing unit (CPU) 42 within uP 36 executes control programs contained within memory, such as EEPROM 44 shown in FIG. 1, in response to commands provided by a user, e.g., via IR remote control 28 and IR receiver 46. For example, activation of a "CHANNEL UP" feature on the remote control 28 causes CPU 42 to send a "change channel" command along with channel data to tuner 32 via I2C_BUS serial data bus. Consequently, tuner 32 tunes the next channel in the channel scan list. Another example of a control program stored in EEPROM 44 is software for implementing the operations shown in FIG. 2, to be described in greater detail hereinafter.

CPU 42 also controls functions included within uP 36 via bus 48. In particular, CPU 42 controls auxiliary data processor 50 and on-screen display (OSD) processor 52.

OSD processor 52 operates in a conventional manner to produce R, G, and B video signals OSD_RGB that, when coupled to the display device 16, will produce a displayed image representing on-screen display information such as graphics and/or text comprising an electronic program guide (EPG) or system configuration menus 19. OSD processor 52 also produces control signal FSW which is intended to control a fast switch for inserting signals OSD_RGB into the system's video output signal at times when an on-screen display is to be displayed. For example, when a user enables a configuration menu 19, e.g., by activating a particular key on the remote control 28, CPU 42 enables the OSD processor 52 so that processor 52 selects menu data from the EEPROM 44 and produces signals OSD_RGB representing the selected configuration menu data. The OSD processor also produces signal FSW indicating when the menu is to be displayed.

Video signal processor (VSP) 40 performs conventional video signal processing functions, such as luma and chroma processing. Output signals produced by VSP 40 are suitable for coupling to the display device 16, e.g., a kinescope or LCD device, for producing the multi-image 14. VSP 40 also includes the fast switch for coupling signals produced by OSD processor 52 to the output video signal path at times when graphics and/or text is to be included in the displayed multi-image 14.

The input signal for VSP 40 is signal PIPV that is output by picture-in-picture (PIP) unit 38. When a user activates PIP mode, signal PIPV represents a main image (large picture) into which an auxiliary image (small picture) is inset. When PIP mode is inactive, signal PIPV represents just the main image, i.e.; no auxiliary image signal is included in signal PIPV. The described operation of PIP unit 38 is provided by features of PIP unit 38 including video switch 54, I²C interface 56, PIP processor 58 and RAM 60. Switch 54 operates under user control for determining the coupling of the four input baseband video signals VIDEO A, VIDEO B, VIDEO 1 IN and VIDEO 2 IN to the main and auxiliary image signals (LPIXV and SPIXV) within PIP unit 38. Typically, switch 54 couples signal VIDEO A to signal LPIXV and couples either signal VIDEO B, VIDEO 1 IN or VIDEO 2 IN to signal SPIXV, but switch 54 can swap the connections or couple one input signal to both the main and auxiliary signal lines. I²C interface 56 provides a bidirectional control and data interface between the I²C bus and the functions within PIP unit 38. Thus, main uP 36 can control the operation of switch 54 and PIP processor 58 via the I²C bus.

When PIP processing is activated, PIP processor 58 implements the PIP function in a conventional manner. Briefly, PIP processor 58 converts signal SPIXV to digital data via analog-to-digital converters (ADC) that are included in PIP processor 58. The digital data is subsampled to reduce the amount of data and to reduce the size of the auxiliary image that is displayed. The subsampled data is stored in RAM 60 until the auxiliary image display interval at which time the stored auxiliary image data is read from RAM 60 and converted into an analog auxiliary image signal via digital-to-analog converters (DAC) that are included in PIP processor 58. A switch (not shown) included in PIP processor 58 integrates the analog auxiliary image signal into signal PIPV during the auxiliary image display interval to provide a signal for displaying a PIP image.

When a configuration menu 19 is displayed, uP 36 executes a control program stored in EEPROM 44. The control program monitors the location of a position indicator, such as a cursor and/or highlighting, in the displayed menu and displays an auxiliary image in the PIP window that corresponds to the highlighted menu option, in accordance with the flowchart in FIG. 2. A user controls the location of the position indicator using direction and selection keys of the remote control 28. Alternatively, the system may include a mouse device for controlling the location of the position indicator.

Suitable components for implementing the features of the system shown in FIG. 1 that have been described thus far comprises an ST9296 microprocessor produced by SGS-Thomson Microelectronics for providing the features associated with uP 36; an M65616 picture-in-picture processor produced by Mitsubishi for providing the described basic PIP functionality associated with PIP processor 38; and an LA7612 video signal processor produced by Sanyo or providing the functions of VSP 40.

Figure 2:
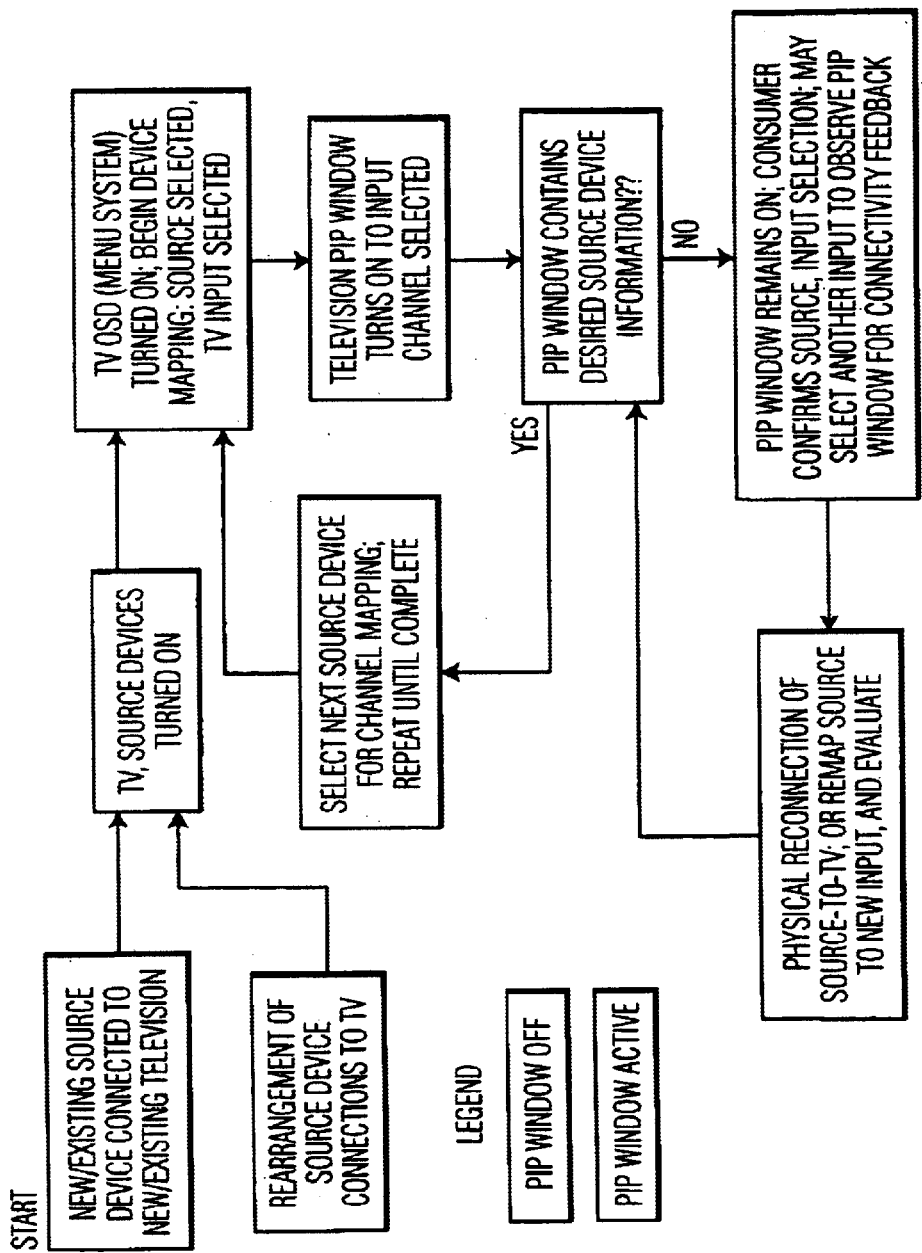
FIG. 2 depicts a flow chart illustrating the operation of the television apparatus incorporating the principles of the present invention.

FIG. 2 depicts a flowchart 100 of a method performed by the television receiver 12 for simultaneously displaying in one region of the display a configuration menu 19 during the mapping process (see FIG. 5), and displaying in another region of the display (or PIP window 20) the video image associated with the input signal (VIDEO A, VIDEO B, VIDEO 1 IN, VIDEO 2 IN) provided at the input source 22, 24, 26 corresponding to the highlighted option in the displayed configuration menu 19. The currently selected/tuned input signal (VIDEO A) may be displayed as the main image 18 of the display 16. The following method describes the autotuning process to illustrate the present invention.

When a source device (i.e., DVD player, VCR, satellite receiver, etc.) is initially connected to one of the number of available input sources 22, 24, 26, or is switched to a different input source, the consumer may wish to map the input source connected to the added or switched input source to a particular key of the remote control 28. Mapping of the input source to a particular key of the remote control enables a user to display the video signal of the desired source device by simply pressing the corresponding particular key. Each particular key includes distinctive indicia, such as alphanumeric characters and symbols. Preferably, the indicia intuitively identify each of the input sources. For example, the remote control may include a plurality of keys labeled "VCR1", "VCR2", "DVD" and "SAT", respectively, for tuning/selecting the television receiver 12 to the desired input source 22, 24, 26 by depressing the corresponding key of the remote control. The "VCR1" and "VCR2" keys may correspond to a pair of respective VCRs that are connected to the television receiver 12. The "DVD" key may correspond to a DVD player that is also connected to an input source of the television receiver. Lastly, the "SAT" key may correspond to a satellite programming source device, such as a satellite receiver, that is connected an input source of the television receiver 12.

Referring to FIG. 2, the OSD processor 52 in step 110 generates an OSD_RGB signal for displaying an "AUTO-TUNING" menu 64 overlaid on the main video image 18, as shown in FIG. 3, in response to a signal generated by the remote receiver 46 corresponding to a predetermined key (i.e., "MENU" key) of the remote control 28 actuated by a user. One skilled in the art will appreciate that a user may be required to step through a predetermined number of menu displays before displaying the "AUTOTUNING" menu 64. When activated, the "AUTOTUNING" menu appears in one image region of the display, overlayed on the main image 18 of the currently selected input signal, as shown in FIG. 3.

As shown in FIG. 3, the "AUTOTUNING" menu 64 of the OSD display provides a plurality of options selectable by the user for mapping an input source 22, 24, 26 to a designated channel selectable by a key on the remote control 28. For example, option "1" provides for mapping the "VCR1" channel to a selected input source, wherein the "VCR1" channel is associated with a key labeled "VCR1" on the remote control 28. Option "2" provides for mapping the "VCR2" channel to a selected input source, wherein the "VCR2" channel is associated with a key labeled "VCR2". Option "3" provides for mapping the "DVD" channel to a selected input source, wherein the "DVD" channel is associated with a key labeled "DVD". Option "4" provides for mapping the "SAT/CABLE" channel to a selected input source, wherein the "SAT/CABLE" channel is associated with a key labeled "SAT". Option "5" provides for exiting the "AUTOTUNING" menu 64.

The OSD processor 52 in step 112 highlights an option in response to the user pressing the directional keys (i.e., "UP" key, "DOWN" key) of the remote control 28, for example. As the user depresses a directional key, the OSD processor 52 sequentially highlights one of the five options in the "AUTOTUNING" menu 64. Highlight is defined as any visual distinction from the other displayed options, such as underlining, bolding, bordering and changing the font of the option, or providing an icon adjacent the selection of the option. When the desired option is highlighted, the user activates a selection key, such as a key labeled "ENTER", on the remote control 28 to select the highlighted option. In turn, the CPU 42 in step 114 retrieves the selected "channel mapping" menu 66 (e.g., "SET DVD CHANNEL" menu), as shown in FIG. 4, from memory 44 and provides the selected menu 66 to the OSD processor 52. The VSP 40 then overlays the selected menu provided by the OSD processor 52 over the main image, preferably displayed to avoid interference with the PIP window 20.

Further, in accordance with the present invention, the CPU 42 generates a control signal to display an auxiliary image in the PIP window. The CPU also controls a tuner 32 and PIP processor 38 to display the video image in the PIP window corresponding to the highlighted option in the "channel mapping" menu.

For example as shown in FIG. 3, the user may highlight the third option (i.e., "SET DVD CHANNEL") of the "AUTOTUNING" menu 64 to map one of the input sources 22, 24, 26, to the "DVD" key on the remote control 28. When the third option is selected by pressing the "ENTER" key of the remote control 28, a "SET DVD CHANNEL" menu 66 (see FIG. 4) is displayed, which replaces the "AUTOTUNING" menu 64. The "SET DVD CHANNEL" menu, as shown in FIG. 4, displays a plurality of options of input sources selectable by the user that may be mapped to the "DVD" key of the remote control 28. Specifically, the selection of option "1" provides for mapping of the "DVD" key to none of the input sources. The selection of option "2" programs the CPU 42 to select the RF_IN input source 22 and tune tuner 32 of the television receiver 12 to "Channel 3" for display when the "DVD" key is activated. The selection of option "3" programs the CPU 42 to select the RF_IN input source 22 and tune tuner 33 of the television receiver to "Channel 4" for display when the "DVD" key is activated. The selection of option "4" programs the CPU 42 to select the "Video 1 IN" input source 24 for display when the "DVD" key is activated. Lastly, the selection of option "5" programs the CPU 42 to select the "Video 2 IN" input source 26 for display when the "DVD" key is activated. One skilled in the art will appreciate that the present invention may be used with more than two auxiliary video inputs (Video 1 IN and Video 2 IN), perhaps eight or more video inputs.

FIGS. 4–8 are illustrative of the multi-image screen displays 14 when each respective option of the "Set DVD Channel" menu 66 is highlighted. When the "Set DVD Channel" is initially displayed, OSD processor 52 in step 116 highlights option "1" labeled "Not Connected", as shown in FIG. 4. The screen display 14 comprises a main video image disposed in one region of the display and an OSD display 19 disposed in another region of the display. The main video image 18 is one of the four input video signals (VIDEO A, VIDEO B, VIDEO 1 IN, VIDEO 2 IN) selected by the video switch 54 of the PIP processor 38. In this example, the main image corresponds to the video signal (VIDEO A) provided from tuner 32, which is tuned to "Channel 3" of the RF_IN signal. The OSD processor 52 in step 118 displays the "SET DVD CHANNEL" menu 66 and a text window 68 instructing the user to turn on all sources devices to enable the respective input signals to be fedback through the PIP window. The PIP window 20 is not displayed on the screen display when option "1" is highlighted.

In response to the user using the directional keys on the remote control 28, the OSD processor 52 highlights in step 116 one of the corresponding five options of the "SET DVD CHANNEL" menu 66. As instructed by the window shown in FIG. 4, the user should turn all the input source devices (e.g., VCRs, DVD, satellite receiver, etc.) connected to the input sources 22, 24, 26 of the television receiver 12. To take advantage of the present invention of providing visual feedback, when the configuration menu is displayed, the input source device that the user wishes to map to the corresponding key of the remote control 28 must be turned on.

When the user selects any one of the four other options (i.e., Options 2–5) using the directional keys of the remote control 28, the selected option in step 116 is highlighted and an auxiliary image appears on the display as a PIP window 20. The PIP image comprises the video image provided at the source input 22, 24, 26 corresponding to the highlighted option.

Figure 5:
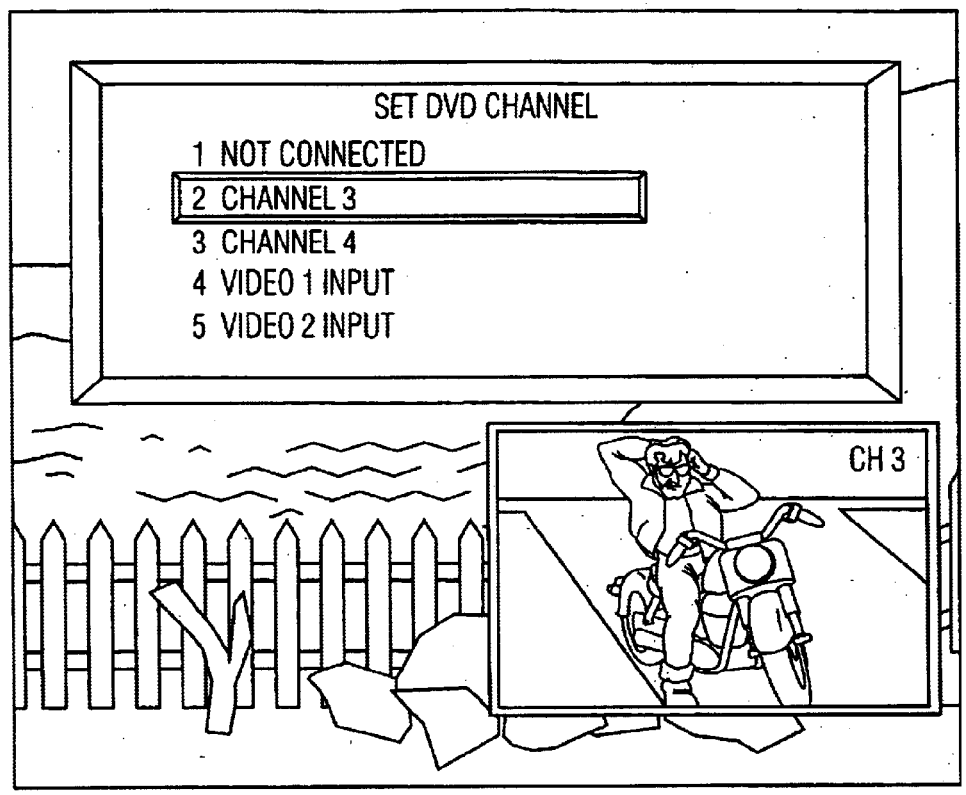
FIG. 5 depicts the screen display of the present invention showing the "SET DVD CHANNEL" menu and an auxiliary image provided on "Channel 3" of a television broadcast signal.

For example, FIG. 5 is illustrative of the multi-image display 14 when option "2" of the "SET DVD CHANNEL" menu 66 is highlighted. In response to the highlighting of Option "2", the CPU 42 in step 120 activates the PIP processor 58 to provide signals suitable for displaying the video signal, VIDEO A, from tuner 32 as a PIP image 20 on the display screen 16. Tuner 32 is tuned to Channel 3 of the input broadcast signal provided at the "REF_IN" input source 22.

Figure 6:
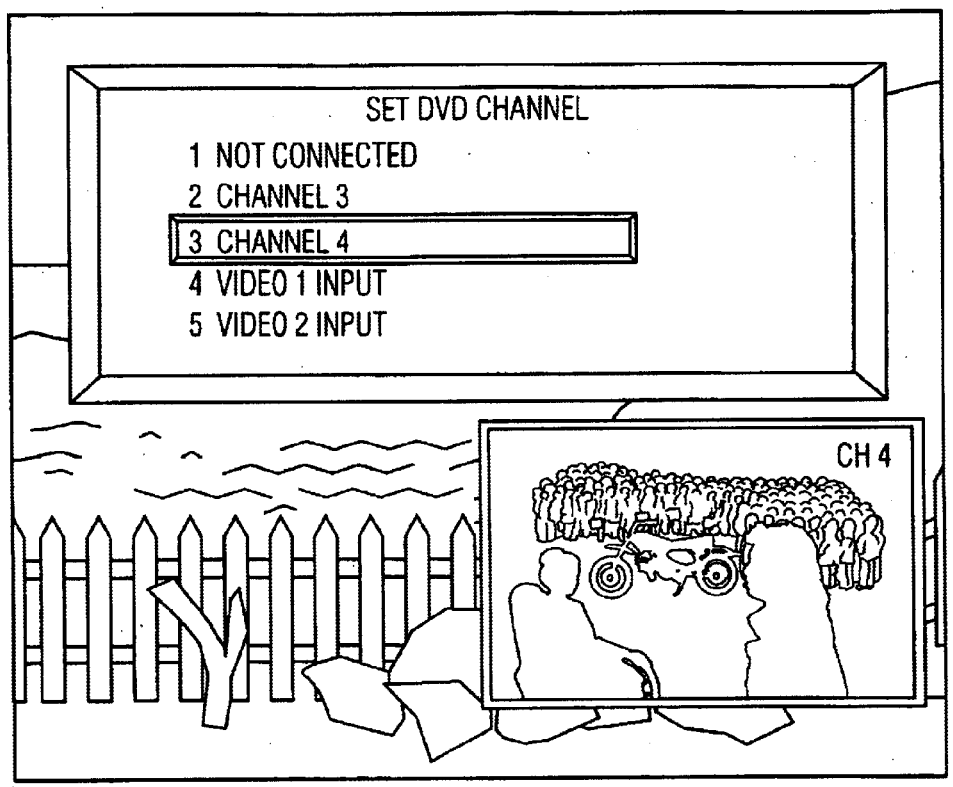
FIG. 6 depicts the screen display of the present invention showing the "SET DVD CHANNEL" menu and an auxiliary image provided on "Channel 4" of a television broadcast signal.

Similarly, FIG. 6 is illustrative of the multi-image display 14 when option "3" of the "SET DVD CHANNEL" menu 66 is highlighted. In response to the highlighting of Option "3", the CPU 42 in step 124 activates the PIP processor 58 to provide signals suitable for displaying the video signal, VIDEO B, from tuner 33 as a PIP image 20 on the display screen 16. Tuner 33 is tuned to Channel 4 of the input broadcast signal provided at the "REF_IN" input source 22.

Figure 7:
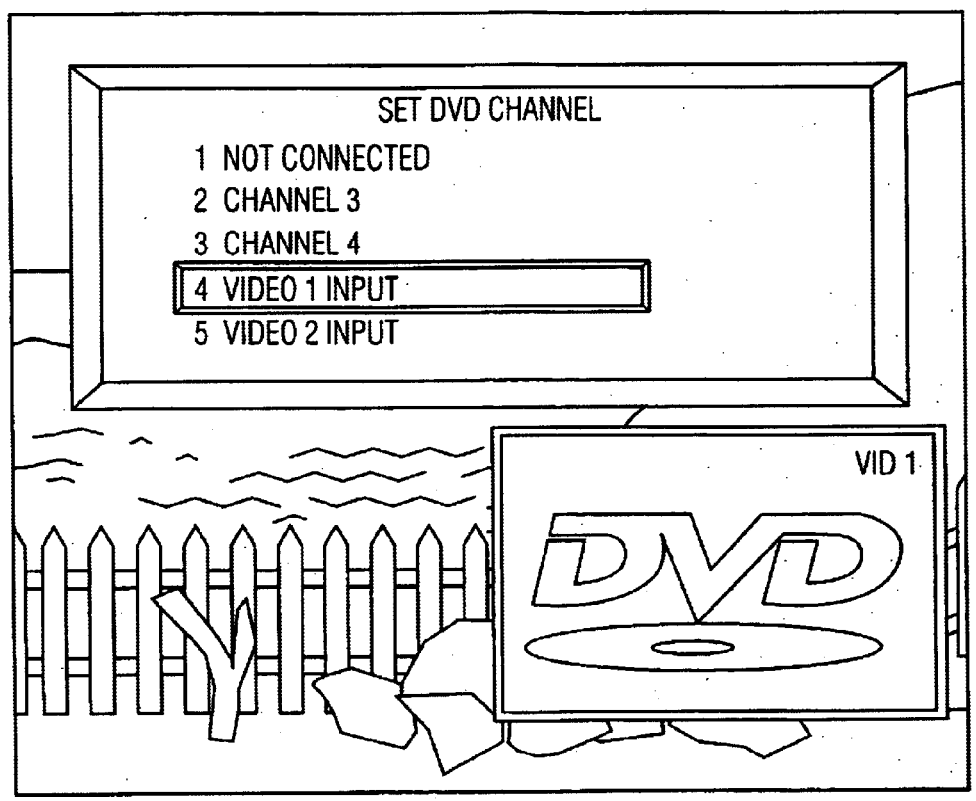
FIG. 7 depicts the screen display of the present invention showing the "SET DVD CHANNEL" menu and an auxiliary image provided at first video input.

FIG. 7 is illustrative of the multi-image display 14 when Option "4" of the "SET DVD CHANNEL" menu 66 is highlighted. In response to the highlighting of Option "4", the CPU 42 in step 126 activates the PIP processor 58 to provide signals suitable for displaying the video signal, VIDEO 1 IN, provided at the "VIDEO 1 IN" input source 24 as a PIP image 20 of the display screen 16.

Figure 8:
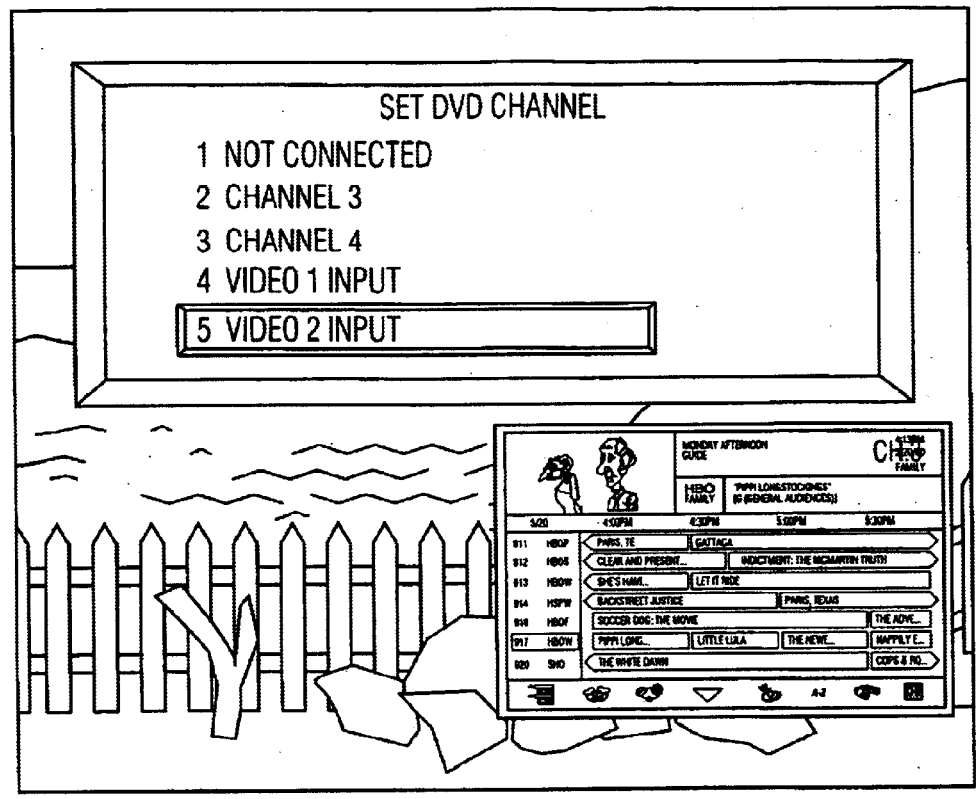
FIG. 8 depicts the screen display of the present invention showing the "SET DVD CHANNEL" menu and an auxiliary image provided at a second video input.

FIG. 8 is illustrative of the multi-image display 14 when Option "5" of the "SET DVD CHANNEL" menu 66 is highlighted. In response to highlighting Option "5", the CPU 42 in step 128 activates the PIP processor 58 to provide signals suitable for displaying the video signal, VIDEO 2 IN, provided at the "VIDEO 2 IN" input source 26 as a PIP image 20 of the display screen 16.

As shown in FIGS. 5–8, the PIP image 20 corresponding to the highlighted option provides simultaneous feedback of the video signals (VIDEO A, VIDEO B, VIDEO 1 IN, VIDEO 2 IN) provided at the selected input source/tuner during the display of the configuration menu 66. This simultaneous feedback enables a user to immediately confirm that an input source device is properly connected to the desired source input 22, 24, 26. Furthermore, the television system 10 may also be used to provide feedback to confirm that the desired input source is mapped to the desired key of the remote control unit 28.

For example, the user first highlights the corresponding input source option (i.e., Options 1–5) in the "SET DVD CHANNEL" menu 66 that the user believes is connected to the desired auxiliary (source) device (DVD player, satellite receiver, VCR, etc.). The user then verifies the selected source is connected to the highlighted option corresponding to the input source (i.e., VIDEO 1 IN) by verifying the PIP image 20 corresponds to the video signal provided at the desired (or highlighted) source. If PIP window displays the image from the desired input source, the user actuates the selection or enter key of the remote control. In response to the actuation of the enter key, the CPU 42 in step 122 maps the selected input source to the corresponding key of the remote control 28. If not, the user may step through the other options of the "SET DVD CHANNEL" menu to determine which input source of the desired input source device is connected to, and map the "DVD" key to the correct input source using the PIP window 20. Alternatively, the user may reconnect the "DVD" player to the desired input source (22, 24, 26) using the PIP window 20 to verify that the connection is correct.

It is to be understood that the embodiments and variations shown and described herein are for illustrations only and that various modifications may be implemented by those skilled in the art without departing from the scope and spirit of the invention.

What is claimed is:

1. Television apparatus comprising:

means (40) for generating an image signal suitable for displaying one of a plurality of signal sources in a main region of a display (16);

means (52) for generating a menu signal suitable for displaying a menu in a first region of a display on said main region, the menu including a plurality of options, each menu option being associated with auto-tuning of a respective one of a said plurality of signal sources;

means (42) for selecting one of the menu options of the menu, said means for selecting including a plurality of keys, each key being representative of a respective source;

means (58) for generating a feedback signal in a second region of the display on said main region suitable for communicating to the user while the menu is displayed, information related to auto-tuning the signal source associated with the selected menu option; and means (42) for mapping said signal source associated with said selected menu option to a key of said selecting means, in response to a mapping signal provided by a user, whereby selection of said key of said data input means will cause said apparatus to tune said signal source and a user is able to immediately tune back to view the main image after auto-tuning.

2. The television apparatus of claim 1, wherein the feedback signal is a video signal suitable for displaying the source signal associated with the selected menu option.

3. The television apparatus of claim 2, wherein the second region of the display is a PIP window.

4. The television apparatus of claim 1, wherein the feedback signal is an audio signal suitable for providing audible feedback of the signal source associated with the selected menu option.

5. The television apparatus of claim 1, wherein one of the source signals is a baseband signal.

6. A method for programming a television apparatus; the method comprising:

receiving a plurality of source signals;

generating a main image from one of said plurality of source signals on a display;

generating a menu signal suitable for displaying a menu in a first region of a said display on said main image, the menu including a plurality of options, each menu option being associated with auto-tuning of a respective one of a plurality of source signals;

selecting one of the menu options of the menu; and generating a feedback signal in a second region of said display on said main image suitable for communicating to the user while the menu is displayed, the feedback signal information related to auto-tuning the signal source associated with the selected menu option;

mapping said signal source associated with said selected menu option to a key of a data input means, in response to a mapping signal provided by a user, whereby upon selection of said key of said data input means said apparatus is caused to tune said signal source; and tuning back to the main image after auto-tuning.

7. The method of claim 6, wherein the feedback signal is an audio signal suitable for providing audible feedback of the signal source associated with the selected menu option.

8. The method of claim 6, wherein one of the source signals is a baseband signal.

* * * * *